April 3, 1945.  W. C. TOMPKINS ET AL  2,372,750

FRICTION CLUTCH

Filed May 12, 1942   2 Sheets-Sheet 1

INVENTORS
Wilfred C. Tompkins
Alec Doe
BY
Loyd Hall Sutton
ATTORNEY

April 3, 1945.  W. C. TOMPKINS ET AL  2,372,750
FRICTION CLUTCH
Filed May 12, 1942  2 Sheets-Sheet 2

INVENTORS
Wilfred C. Tompkins
Alec Doe
BY
Loyd Hall Sutton
ATTORNEY

Patented Apr. 3, 1945

2,372,750

UNITED STATES PATENT OFFICE 2,372,750

FRICTION CLUTCH

Wilfred Charles Tompkins and Alec Doe, Wolverhampton, England, assignors to Boulton Paul Aircraft Limited, Codsall, Wolverhampton, England, a British company Application May 12, 1942, Serial No. 442,715
In Great Britain November 29, 1940

6 Claims. (Cl. 89—33)

This invention relates to friction clutches.

One object of the invention is to provide an improved form of clutch in which the thrust between the friction plates forming the driving and driven elements is balanced so that there is no thrust on the clutch bearings.

A further object is to provide an improved form of friction clutch in which the friction plates forming the driving and driven elements are normally slipping and the pressure between the friction plates can be accurately controlled so that the amount of slip, and hence the driving effort transmitted by the clutch, can be accurately controlled.

A still further object of the invention is to provide apparatus for assisting the feed of ammunition belts to machine guns in which a friction clutch having the above characteristics transmits the drive from a source of motive power to a feed assisting sprocket meshing with the ammunition belt, the pressure between the friction elements of the clutch being varied automatically in accordance with slight variations in belt tension so that the amount of slip, and hence the drive transmitted to the feed assisting sprocket, is varied to maintain a substantially constant tension in the ammunition belt.

With these and other objects in view, as will hereinafter appear, the invention comprises the novel arrangement and combination of parts hereinafter described and claimed, it being understood that changes in the particular embodiment of the invention, hereinafter described, may be made within the scope of the claims without departing from the invention.

A particular embodiment of the invention in mechanism for feeding ammunition belts to machine guns is illustrated in the accompanying drawings in which—

Figure 1:
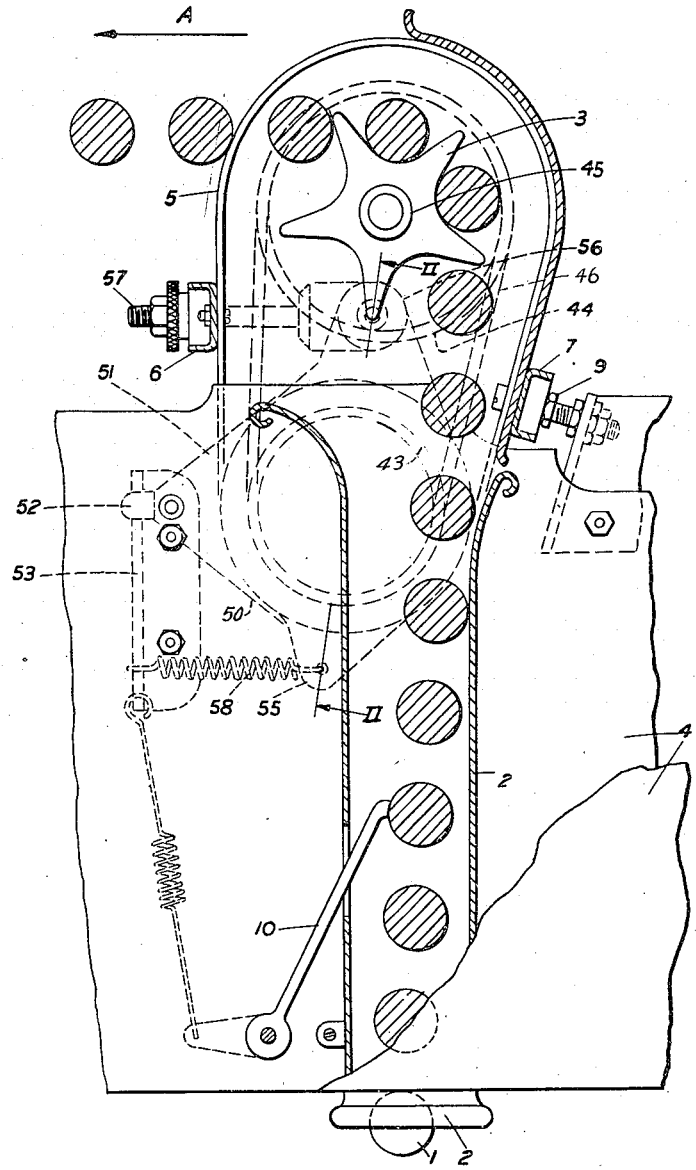
Figure 2:
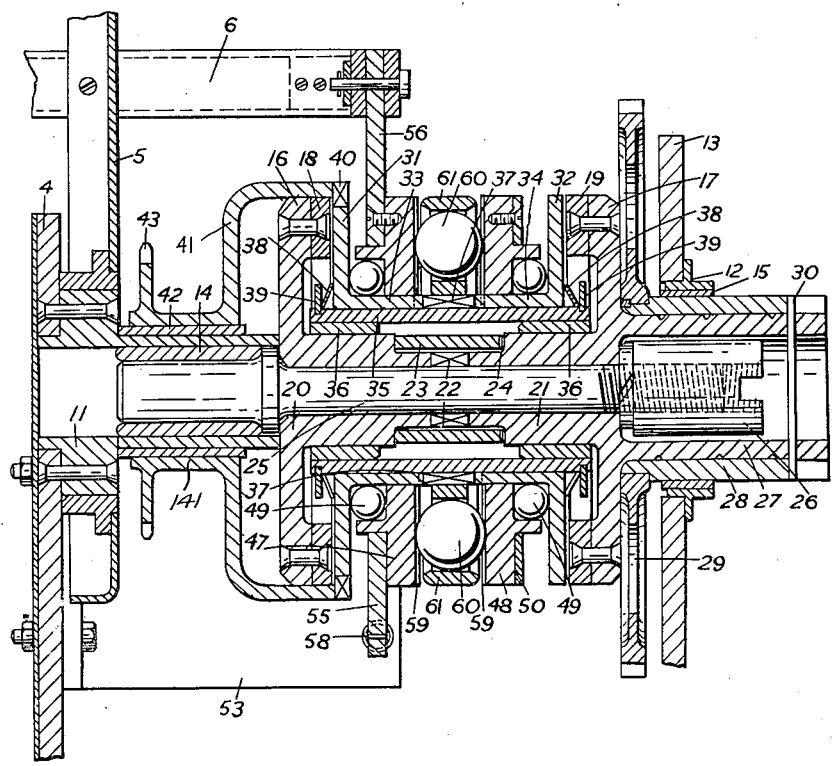

Fig. 1 is a part vertical section of an ammunition belt feeding mechanism embodying the invention and Fig. 2 is part of a section taken along the line II—II of Fig. 1 shewing details of the clutch mechanism.

Referring to Fig. 1 of the drawings, the ammunition belt 1 is fed from below through the guide chute 2 and over a feed sprocket 3 in the direction of the arrow A to a machine gun (not shewn) situated to the left of the drawing.

The guide chute 2 is supported between two bearing plates 4. The feed sprocket 3 is carried in two supports 5 (one of which is shown) mounted one on each of the plates 4 and connected by channel members 6 and 7. The plates 5 are capable of rocking in the anticlockwise direction in Fig. 1 about the clutch axis. Rotation in the clockwise direction in Fig. 1 is prevented by the stop 9.

A spring loaded sprag 10 prevents the ammunition belt from falling through the chute 2 in the event of breakage or slackness occuring in the belt.

The clutch (Fig. 2) is mounted in bearings 11 and 12 of which bearing 11 is located in one of the plates 4 and bearing 12 is located in a bearing plate 13. Self lubricating bushes 14 and 15 are provided.

The driving element of the clutch consists of two discs 16 and 17 having friction linings 18 and 19 respectively and integral bosses 20, 21. The bosses 20, 21 are provided with interengaging dogs 22 and the spacing of the discs is determined by a distance tube 23 and shims 24, the discs being bolted together by means of a large central bolt 25 and nut 26. Disc 17 is also provided with an outwardly directed boss 27 carrying a sleeve 28 on which is rigidly mounted the driving pinion 29. Boss 27 and sleeve 28 have a driving connection constituted by shear pin 30. The relatively fixed bosses 20, 21 and 27 constitute the driving shaft of the clutch. The shaft is built up in this manner to facilitate the assembly and initial setting of the clutch.

The driven element of the clutch is constituted by two discs 31 and 32 co-operating with the discs 16 and 17 respectively. The discs 31 and 32 are provided with integral bosses 33, 34 respectively and are movable axially of the driving element on which they are mounted through the intermediary of sleeve 35 and interposed self lubricating bushes 36. The discs 31 and 32 are prevented from rotating relative to each other and to the sleeve 35 by means of dogs on the latter engaging dogs on the bosses 33, 34 of the discs. These interengaging dogs are indicated diagrammatically at 37. The discs 31, 32 are urged together by means of spring washers 38 held in position by means of circlips 39.

The drive is taken from the disc 31 by means of dogs 40 thereon engaging dogs provided at the periphery of a cup shaped member 41 mounted by its elongated boss 141 for rotation about the fixed bearing 11, a self lubricating bush 42 being provided. The elongated boss 141, which constitutes the driven shaft of the clutch, carries at its end a sprocket 43 driving a sprocket 44 (Fig. 1) on the ammunition belt feed roller spindle 45 by means of chain 46.

The discs 31 and 32 are normally located just clear of the friction linings on the driving discs 16 and 17 and are forced apart axially of the clutch into engagement with the driving discs by means of the following mechanism.

Two plates 47, 48 are loosely mounted on the bosses of the driven discs 31 and 32 and a thrust bearing 49 is disposed between each plate and the adjacent driven disc. Plate 48 is held against rotation by means of a disc 50 secured thereto and having a tongue 51 extending first radially from the disc 50 and then bent substantially at right angles so as to lie parallel to the clutch axis and terminating in a tip portion 52 bent outwardly to engage in a notch in plate 53 bolted to one of the plates 4.

Plate 47 has secured thereto a disc provided with two diametrically opposed radially extending tongues 55, 56. Tongue 56 is coupled by rod 57 to the channel member 6 bridging the plates 5. Tongue 55 is connected by a tension spring 58 to the plate 53. The spring 58 urges the coupled plates 5 against the stop 9.

The opposing faces of the plates 47, 48 are provided with a plurality of radial grooves 59 of shallow V section, the grooves in one plate being disposed opposite those in the other. A ball 60 is held in position between the two plates in each pair of opposite grooves by means of a ball cage 61.

The operation of the device is as follows:

Assuming that the gun is not firing, there will be no tension in the ammunition belt and the rocking plates 5 will remain held against the stop 9 by spring 58. The driven discs 31, 32 will remain just clear of the driving discs 16, 17 which will be rotating continuously.

As soon as the gun commences to fire, tension is imparted to the ammunition belt, and this causes the plates 5 to rock in the counterclockwise direction in Fig. 1. This rotates the plate 47 in the same direction through the intermediary of rod 57 and disc 55.

Rotation of the plate 47 relative to the locked plate 48 causes the balls 60 to ride up the sides of the shallow grooves 59 which thus act as cams to force apart the two plates 47, 48 against the action of the spring washers 39. The movement apart of the two plates 47, 48 transmits a similar movement to the two driven discs 31, 32 through the interposed thrust bearings 49 and these driven discs are forced into engagement with the friction linings on the driving discs 16, 17 with a pressure dependent upon the degree of rotation of the plate 47. This effects rotation of the driven discs which in turn rotate the driven shaft 141 through the dogs provided on disc 31 co-operating with the corresponding dogs on the cup shaped member 41. The feed sprocket 3 is thus rotated through chain wheels 43, 44 to feed the ammunition belt to the gun. There will still be a certain amount of slip between the driving and driven discs and such slip will be further decreased with a further increase in belt tension.

If the feed sprocket feeds the ammunition belt faster than is desired by the gun, the tension in the ammunition belt between the feed sprocket and the gun decreases thus allowing the plates 5 and the rotatable clutch operating plate 47 to return towards their normal positions. The two plates 47, 48 thus move towards each other under the action of the spring washers 39, thus permitting a greater degree of slip between the driving and driven discs so that the feed sprocket does not feed the ammunition belt so rapidly towards the gun.

If the gun stops firing, the plates 5 and the rotatable clutch operating plate 47 move right back to their original positions and no drive is transmitted by the clutch.

It will be seen that the plate 47 is subjected to a turning torque which varies with slight variations in the belt tension so that such variations are corrected immediately and a substantially even belt tension is maintained.

From the foregoing description it will be clear that the thrusts exerted by the two slidable discs on the driving discs 16, 17 are exactly balanced and the main bearings 11, 14 and 12, 15 are not subjected to any thrust loads. Further the mechanical advantages obtained from the inclined cam surfaces 59 and the rocking plates 5 make possible a very accurate control of the pressure between the friction surfaces of the clutch.

If for any reason the feed mechanism jams with the clutch engaged, pin 30 will shear and no torque can then be transmitted to the jammed mechanism. In the construction illustrated, pin 30 is shown as passing through holes in boss 27 but if desired both members 27 and 28 may be slotted to accommodate a quickly detachable shear pin which is held in position by means of a clip.

Instead of the balls 60 co-operating with radial grooves, they may be mounted in shallow conical recesses. With such a construction, the ball cage 61 may be dispensed with if desired.

Instead of the sprocket 3 being rotated by chain drive from the driven shaft 141 of the clutch, this sprocket may be an idler sprocket and a feed sprocket may be mounted directly on a hollow driven shaft passing through both plates 4 and carrying the cup shaped member 41.

Although the invention has been described with reference to feed mechanism for machine guns, the clutch according to the invention is not limited to such use but is capable of general application. The control arm constituted by the radial extension 56 on disc 55 may be operated automatically in accordance with a variable factor or it may be manually operated. The clutch is also capable of being remotely controlled, for example by means of a solenoid operating the control arm.

It will be apparent that the driven and driving elements of the clutch may be reversed, that is to say the elongated boss 141 may constitute the driving shaft and the bosses 20, 21 and 27 may constitute the driven shaft.

What we claim is:

1. A friction clutch comprising a driving shaft and a driven shaft, two friction discs rigidly mounted in spaced relation on one of said shafts, two discs loosely mounted on said shaft between said first mentioned discs and movable into engagement therewith a driving connection between one of said loosely mounted discs and the other shaft, a pair of co-operating cam faced plates loosely mounted on said first mentioned shaft between said loosely mounted discs and means for rotating one of said plates relative to the other, said plates being operative upon such relative rotation to force said loosely mounted discs into engagement with said rigidly mounted discs with a pressure dependent upon the degree of said relative rotation of the plates.

2. A friction clutch comprising a driving shaft and a driven shaft, two friction discs rigidly mounted in spaced relation on one of said shafts, two discs loosely mounted on said shaft between said first mentioned discs and movable into engagement therewith, a driving connection between one of said loosely mounted discs and the other shaft, a pair of co-operating cam faced plates loosely mounted on said mentioned shaft between said loosely mounted discs, means resiliently urging said plates together, a plurality of cam followers located between said plates and holding said plates apart and means for rotating one of said plates relative to the other to cause said cam followers to ride up the cam surfaces and force the plates further apart, said plates being operative upon such displacement to force the loosely mounted discs into engagement with said rigidly mounted discs with a pressure dependent upon the degree of said relative rotation of the plates.

3. A friction clutch comprising a driving shaft and a driven shaft, two friction discs rigidly mounted in spaced relation on one of said shafts, two discs loosely mounted on said shaft between said first mentioned discs and movable into engagement therewith, a driving connection between one of said loosely mounted discs and the other shaft, a pair of plates loosely mounted on said first mentioned shaft between said loosely mounted discs and having a plurality of radial grooves of shallow V section on their inner faces, a ball cage between said plates, a plurality of balls in said cage each engaging a radial groove in each plate, means resiliently urging said plates together and means for rotating one of said plates relative to the other to cause said balls to ride up the sides of the grooves and force the plates further apart, said plates being operative upon such displacement to force the loosely mounted discs into engagement with said rigidly mounted discs with a pressure dependent upon the degree of said relative rotation of the plates.

4. Apparatus for assisting the feed of ammunition belts to machine guns comprising a feed assisting sprocket meshing with the ammunition belt, a friction clutch comprising a driving shaft, a driven shaft operatively connected to said feed assisting sprocket, two friction discs rigidly mounted in spaced relation on one of said shafts, two discs loosely mounted on said shaft between said first mentioned discs and movable into engagement therewith, a driving connection between one of said loosely mounted discs and the other shaft, a pair of co-operating cam-faced plates loosely mounted on said first mentioned shaft between said loosely mounted discs and means responsive to increase in tension of the ammunition belt to rotate one of said plates relative to the other, said plates being operative upon such relative rotation to force said loosely mounted discs into engagement with said rigidly mounted discs with a pressure dependent upon the degree of said relative rotation of the plates.

5. Apparatus for assisting the feed of ammunition belts to machine guns comprising a feed assisting sprocket meshing with the ammunition belt, a friction clutch comprising a driving shaft, a driven shaft operatively connected to said feed assisting sprocket, two friction discs rigidly mounted in spaced relation on one of said shafts, two discs loosely mounted on said shaft between said first mentioned discs and movable into engagement therewith, a driving connection between one of said loosely mounted discs and the other shaft, a pair of co-operating cam-faced plates loosely mounted on said first mentioned shaft between said loosely mounted discs, means resiliently urging said plates together, a plurality of cam followers located between said plates and holding said plates apart and means responsive to increase in tension of the ammunition belt to rotate one of said plates relative to the other to cause said cam followers to ride up the cam surfaces and force the plates further apart, said plates being operative upon such displacement to force the loosely mounted discs into engagement with said rigidly mounted discs with a pressure dependent upon the degree of said relative rotation of the plates.

6. Apparatus for assisting the feed of ammunition belts to machine guns comprising a feed assisting sprocket meshing with the ammunition belt, a friction clutch comprising a driving shaft, a driven shaft operatively connected to said feed assisting sprocket, two friction discs rigidly mounted in spaced relation on one of said shafts, two discs loosely mounted on said shaft between said first mentioned discs and movable into engagement therewith, a driving connection between one of said loosely mounted discs and the other shaft, a pair of plates loosely mounted on said first mentioned shaft between said loosely mounted discs and having a plurality of radial grooves of shallow V section on their inner faces, a ball cage between said plates, a plurality of balls in said cage each engaging a radial groove in each plate, means resiliently urging said plates together and means responsive to increase in tension of the ammunition belt to rotate one of said plates relative to the other to cause said balls to ride up the sides of the grooves and force the plates further apart, said plates being operative upon such displacement to force the loosely mounted discs into engagement with said rigidly mounted discs with a pressure dependent upon the degree of said relative rotation of the plates.

WILFRED C. TOMPKINS.
ALEC DOE.